April 4, 1944.  J. MIHALYI  2,346,075
FILM SPOOL
Filed May 23, 1942  2 Sheets-Sheet 1
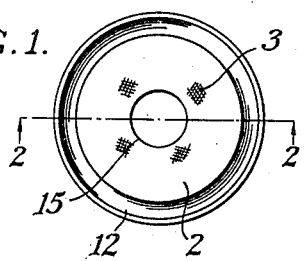
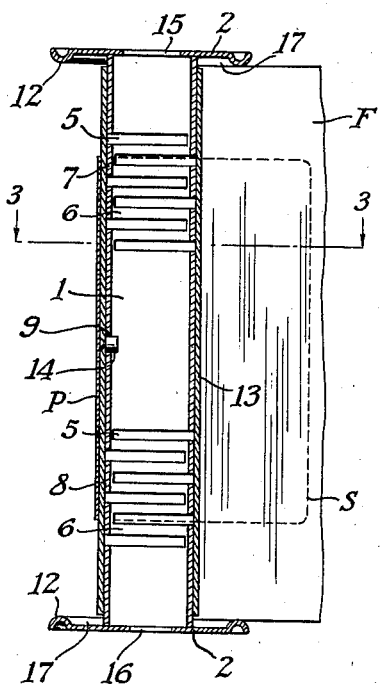
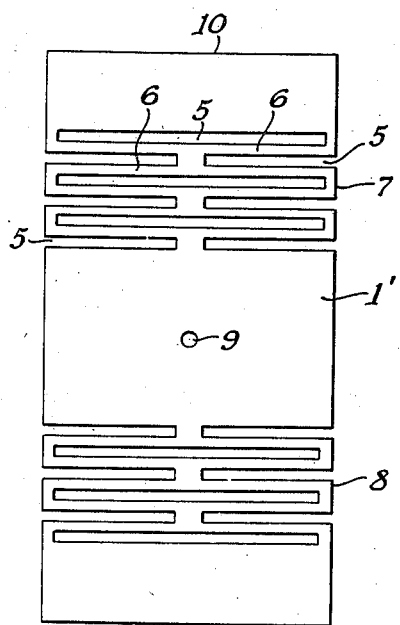
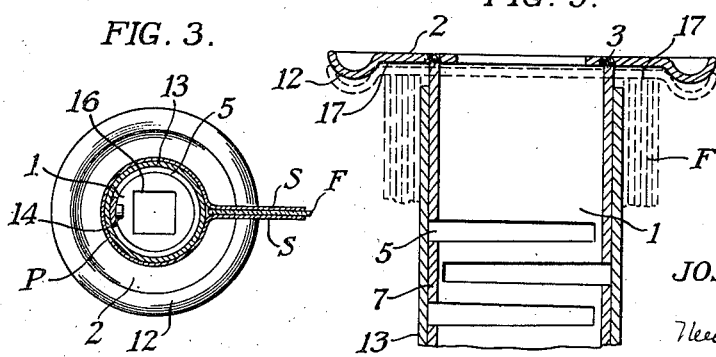
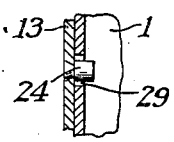
JOSEPH MIHALYI
INVENTOR
BY
ATTORNEYS April 4, 1944.  J. MIHALYI  2,346,075
FILM SPOOL
Filed May 23, 1942  2 Sheets-Sheet 2

JOSEPH MIHALYI
INVENTOR
BY
ATTORNEYS

Patented Apr. 4, 1944

2,346,075

UNITED STATES PATENT OFFICE 2,346,075

FILM SPOOL

Joseph Mihalyi, Rochester, N. Y., assignor to Eastman Kodak Company, Rochester, N. Y., a corporation of New Jersey Application May 23, 1942, Serial No. 444,169

10 Claims. (Cl. 242—70)

This invention relates to photography and more particularly to photographic film spools. One object of my invention is to provide a film spool in which the flanges will be held against convolutions of film or convolutions of film and backing paper to provide a tight light seal therefor. Another object of my invention is to provide a film spool of the type described having a smooth continuous hub on which the convolutions of film may be wound. Another object of my invention is to provide a film spool which is relatively inexpensive in which the distance between the flanges may vary during use of the spool to facilitate winding film to and from the spool and other objects will appear from the following specification, the novel features being particularly pointed out in the claims at the end thereof.

In most spools used for photographic purposes there is considerable difficulty in maintaining a light-tight connection between the spool flanges and the edges of film wound on the spool because, while it is possible to hold the distance between fixed flanges quite accurate, it is not possible to slit film so that it will remain accurate in width because film, and particularly nitrate film, expands and contracts with moisture to quite an appreciable extent and, accordingly, there is considerable variation in the width of a single film between the time it is placed on a film spool and the time it is finally unwound from the spool for processing.

My improved spool is especially designed to take care of any reasonable variations in width of the film and, in addition, to facilitate winding and unwinding after the spool has been mounted in a camera.

Coming now to the drawings wherein like reference characters denote like parts throughout:

Fig. 1 is a top plan view of a spool constructed in accordance with and embodying a preferred form of my invention;

Fig. 2 is a section through the film spool of Fig. 1 taken on line 2—2 also showing the end of a film attached to the film spool core;

Fig. 3 is a section taken on line 3—3 of Fig. 2;

Fig. 4 is a punched-out blank which may be rolled up to form the core of the film spool shown in Fig. 2;

Fig. 5 is an enlarged fragmentary view of one end of the film spool shown in the preceding figures indicating possible movement of one of the flanges;

Fig. 6 is a fragmentary detail section showing a pin and slot connection between an inner and outer core which may be substituted for the pin and aperture connection shown in Fig. 2;

Figure 7:
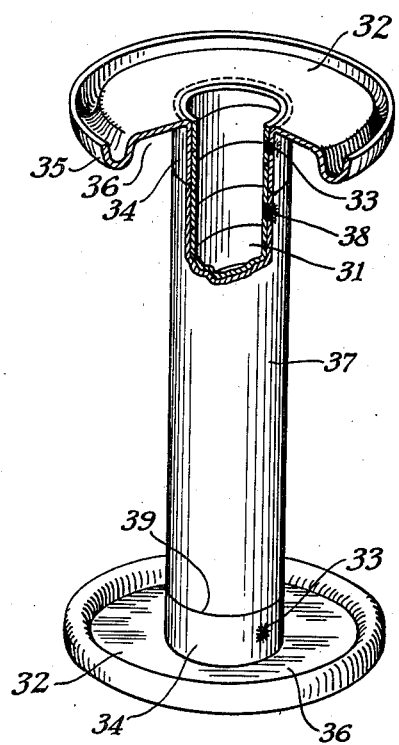
Fig. 7 is a perspective view partially broken away and shown partially in section of a spool constructed in accordance with the second embodiment of my invention.

In accordance with my present invention I have provided a film spool in which the flanges are attached to an inner hub member which is so constructed as to be both extensible and compressible from a normal position of rest, and I provide an outer core member surrounding the inner core so as to provide a smooth surface against which convolutions of film and backing paper may be wound, the outer core member preferably serving to limit the possible inward movement of the film spool flanges.

In the first embodiment of my invention, shown in Figs. 1 to 5 inclusive, the spool may consist of an inner core member 1 to which flanges 2 may be attached in any suitable manner as by spot welding indicated diagrammatically at 3. The inner core member 1 is of special construction and may be rolled up from the blank 1' shown in Fig. 4 into a substantially cylindrical shape. As indicated in Fig. 4, the blank 1' is perforated with a series of slots 5 which are so positioned that narrow bands of metal 6 expand substantially transversely of the blank, the slots and bands being so positioned that the blank when rolled up into a core 1 may stretch or may be compressed from a normal position of rest shown in Fig. 2. I prefer to provide two of these slotted areas 7 and 8. The grid-like formation provides resilient bands and the extent of these grid-like formations together with the width of the slots 5 and narrow metal bands 6 determines the degree of resilience which may be given to metal of known thickness. I find that sheet metal stock of .015" is quite suitable for the purpose and steel is desirable because it is both inexpensive and resilient.

The blank shown in Fig. 4 at 1' is provided with a small aperture 9 and, after being formed as shown in Fig. 4 it is rolled up into the shape of the inner core member 1 shown in Fig. 2. After being so shaped the flanges 2 are spot welded or otherwise attached to the two end portions 10 and 11 which have preferably been left free from perforations so that the flanges 2 will rest on an accurately formed surfaces.

The flanges 2 may be of a known type including inwardly projecting formings 12 which project toward each other so that these portions of the flanges are closer together than other portions.

A second and outer core member 13 may be slid over the inner core member 1 before the flanges are fastened in place or the outer core member 13 may be rolled up over the inner core 1. A pin 14 is provided on the outer core member which projects into the aperture 9 in the inner core member to hold the outer core in place and to transmit driving motion from the inner core 1 to the outer core 13. As will be noticed from Fig. 2, the outer core completely encloses the slots 5 in the grid sections 7 and 8 and thereby prevents any light which may enter the core member 1 through openings 15 and 16 in the spool flanges from reaching the inner convolutions of film.

As also indicated in Figs. 2 and 3, a film F may be attached to the outer core 13 by means of a paster P which passes around the core and is attached to both sides of the film as indicated at S. This type of paster is designed to retain the film on the spool so that it may be wound from the spool until the end is reached after which the direction of movement of the film spool is reversed to rewind the film on the same spool.

With the spool constructed as above described the film F, when completely coiled on the spool, normally lies in the annular recessed area 17 of the spool flanges in which position the formings 12 form an adequate light-tight seal for the edges of the film. If the film cartridge is of the type in which only film is used, a lightproof backing is provided on the film. If, on the other hand, the film is of the type having backing paper, the film backing may be omitted.

Referring to Fig. 5, it will be noted that the film F is shown in dotted lines as lying in the recessed areas 17 of the flanges. When, however, the film F is being unwound, as shown in Fig. 2, the resilience of the inner core member 1 is such that the flanges 2 may move from the broken line positions to the full line positions of Fig. 5. Comparatively little pressure is required to separate the film spools 2 by extending the inner hub member 1 axially since the narrow bands 6 of the grid areas 7 and 8 are both thin and resilient. Consequently the flanges 2 will remain in the position shown in Fig. 5 during the winding and rewinding operations, but as soon as the film F is rewound and again lies in the areas 17 of the film flanges, the inner core member 1 will draw the flanges 2 together and they will snap down into the broken line position of Fig. 5.

Since the outer hub member 13 is attached by the pin 14 and aperture 9, the outer hub member 13 will always remain centrally located with respect to the flanges 2 and provide a smooth surface against which the film F may be coiled. The length of the outer core member 13 is such that if the film F should be slightly narrower than the film shown in Fig. 5, the flanges 2 could still be moved into contact with the edges of the film.

I prefer to provide a film spool in which the outer core 13 is of such a length that when the minimum width film F is wound on the spool, the flanges will be drawn in contact with the film edges by the spring of the inner core 1. The inner core 1 preferably also has a normal position of rest in which the flanges are held in a fixed position from which they may be pressed together or drawn apart upon the application of light pressure.

It is not essential that the outer core 13 be held exactly central of the film spool and, since it is somewhat difficult to provide a pin 14 which will accurately fit an aperture 9 and assemble the pin and aperture, the structure shown in Fig. 6 may be used if desired. Here, there is a pin 24 entering an aperture 29 which is substantially the width of the pin 24 but is somewhat longer, thus forming a pin and slot connection between the inner core member 1 and the outer core member 13.

Referring to Figs. 7 to 10, I have shown a second embodiment of my invention in which there is an inner hub member 31 and flanges 32, these flanges being preferably affixed as by spot welding at 33 to the ends of the inner core member 31.

Figure 8:
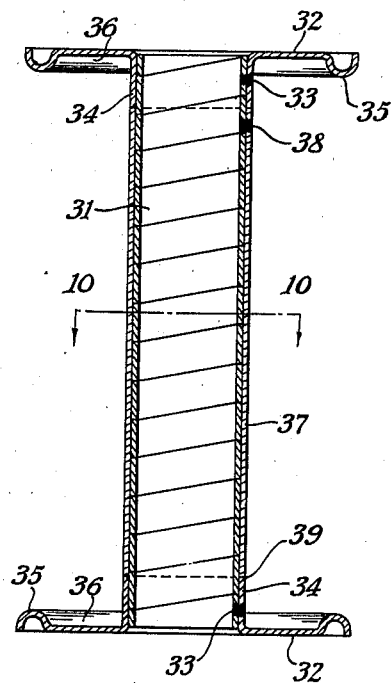
Fig. 8 is a longitudinal section through the spool shown in Fig. 7.
Figure 9:
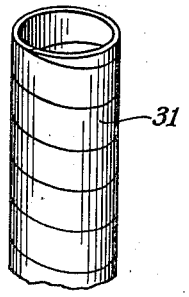
Fig. 9 is a fragmentary view of the inner core member of the spool shown in Fig. 7.
Figure 10:
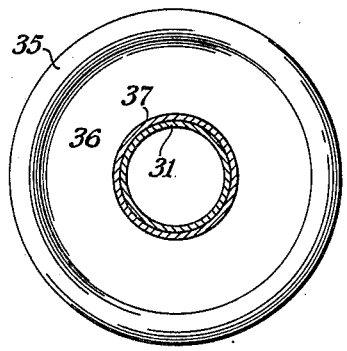
Fig. 10 is a section taken on line 10—10 of Fig. 8.

The inner core member as best shown in Figs. 8 and 9 preferably consists of a coil formed from a flat steel strip, this coil forming in effect a substantially cylindrically-shaped spiral spring. Figs. 8 and 9 show the edges of the coiled strip touching from which position the inner core member 31 may be expanded by applying slight outward pressure to the two flanges 32 which, as above explained, are spot welded to the ends of the inner hub member 31 as indicated at 33.

Flanges 32 differ from the first embodiment of my invention in that they are provided with an inwardly extending flange 34 which closely fits the outside of the inner core member 31 and which is attached thereto. However, these flanges have similar inwardly projecting formings 35 and recessed areas 36 as described with the first embodiment of my invention.

Surrounding the inner core member 31 is an outer core member 37 of tubular form preferably fitting snugly between the inwardly projecting flanges 34 of the end flanges 32. The outer core member 37 is preferably attached to the inner core member at one end as indicated at 38. Thus, if the flanges 32 are separated from each other the outer core member 37 slides over most of the convolutions of the inner hub member 31 and a slot will open up at 39 between the lower end of the outer core member 37 and the upper end of the lower flange 32 when viewing Fig. 8.

In the both embodiments of my invention, the light spring tendency of the inner hub members is in a direction to draw the end flanges lightly against the edges of convolutions of film or convolutions of film and backing paper carried by the spool. In both embodiments of my invention the very light pressure necessary to unwind and wind film will cause the flanges to separate to permit this movement to take place freely. When all of the film has been wound upon the spool shown in both embodiments of my invention, the flanges will be lightly held in a position to exclude all light from entering the edges of the film.

It may be pointed out that in the drawings the scale of the metal and of the formings is greatly exaggerated in order to show the invention more clearly and that the actual movement of the flanges is comparatively slight—say in the order of one-sixteenth of an inch for a film two and one-quarter inches wide. Of course this dimension is by way of illustration only and will vary with different widths of films and different sizes of spools. Actually, the inner extensible hub members are formed of thin sheet steel and, since the grid areas 7 and 8 are comparatively long and since the coiled leaf spring of the inner core member 31 extends throughout the length of the inner core member, there is considerable resiliency in the spools thus formed.

While I have shown two different embodiments of my invention, it is understood that these are by way of illustration only, since obviously variations may be made from the construction shown in the drawings and still be within the scope of the appended claims.

What I declare as new and desire to secure by Letters Patent of the United States is:

1. A spool for photographic film cartridges comprising, in combination, an inner cylindrical shaped extensible core, an outer inextensible core substantially surrounding the inner core, and flanges attached to the ends of the cylindrical shaped core.

2. A spool for photographic film cartridges comprising, in combination, a core comprising a tubular member transversely slotted to provide longitudinal resilience, an outer tubular member substantially enclosing the first named core, and flanges attached to the first named core.

3. A spool for photographic film cartridges comprising, in combination, a core comprising a tubular member transversely slotted to provide longitudinal resilience, an outer tubular member incompletely enclosing the first named core, and flanges attached to the first named core.

4. A spool for photographic film cartridges comprising, in combination, an inner core, means for resiliently positioning the ends of the core at a normal separation, an outer core closely fitting the inner core and of a length somewhat less than the length of the inner core, and flanges fixedly attached to both ends of the inner core.

5. A spool for photographic film cartridges comprising, in combination, an inner core, means for resiliently positioning the ends of the core at a normal separation, an outer core closely fitting the inner core and of a length somewhat less than the length of the inner core, the resilient means for positioning the ends of the inner core at a normal separation being totally enclosed by the outer core.

6. A spool for photographic film cartridges comprising, in combination, an inner core, means for resiliently positioning the ends of the core at a normal separation, an outer core closely fitting the inner core and of a length somewhat less than the length of the inner core, and flanges fixedly attached to both ends of the inner core, and means for holding the outer core in a normal position spaced from the flanges.

7. A spool for photographic film cartridges comprising, in combination, a core comprising a tubular member transversely slotted to provide longitudinal resilience, toward each end of the hub, an outer tubular member substantially enclosing the first-mentioned core and attached to said core between the transversely slotted areas thereof.

8. A spool for photographic film cartridges comprising a pair of tubular sheet metal cores one lying within the other, the inner core being of a normal length greater than that of the outer hub, spring means included in the inner core for varying the length thereof, flanges carried by the inner hub, said outer hub constituting a means for limiting the possible inward movement of said flanges.

9. A spool for photographic film cartridges comprising a pair of cores one lying within the other, the inner core being of a normal length greater than that of the outer hub, spring means included in the inner core for varying the length thereof through slots in the core formed in the metal of the inner core, flanges carried by the inner core, the outer core completely enclosing and forming a light-tight cover for the slotted areas of the inner core.

10. A spool for photographic film cartridges comprising a pair of cores one lying within the other, the inner core being of a normal length greater than that of the outer hub, said inner core including a spirally wound spring strip substantially cylindrical in form, and permitting axial extension, flanges carried by the ends of the inner core, said outer core enclosing the inner core and constituting a means for limiting inward movement of the flanges.

JOSEPH MIHALYI.